United States Patent [19]

Siegmund et al.

[11] Patent Number: 5,266,808
[45] Date of Patent: Nov. 30, 1993

[54] PARTICLE DETECTOR AND METHOD USING A HELICAL ARRAY OF SCINTILLATORS

[75] Inventors: Walter P. Siegmund, Windham, Conn.; Peter Nass, Mainz, Fed. Rep. of Germany

[73] Assignee: Schott Fiber Optics Inc., Southbridge, Mass.

[21] Appl. No.: 913,848

[22] Filed: Jul. 15, 1992

[51] Int. Cl.⁵ .......................... G01T 1/20; G01T 1/204
[52] U.S. Cl. ..................................... 250/368; 250/364; 250/367
[58] Field of Search ........................ 250/368, 367, 364

[56] References Cited

U.S. PATENT DOCUMENTS 5,155,366 10/1992 Miller .................................. 280/368

FOREIGN PATENT DOCUMENTS 207084 10/1985 Japan .................................. 250/368

OTHER PUBLICATIONS

"Szintillierende Mikrolichtleiter zum Hochauflosenden Teilchennachweis", by V. Zacek, Physikalische Blatter 47, (1991) 837-839.
"Investigations On Capillaries Filled With Liquid Scintillator For High Resolution Particle Tracking" By A. Artamonov, et al., Nuclear Instruments and Methods A300, (1991) 53-62.

Primary Examiner—Carolyn E. Fields
Attorney, Agent, or Firm—Bachman & LaPointe

[57] ABSTRACT

A method and apparatus for detecting the line of flight, point of entry and angle of entry of an energetic, ionizing particle uses a helical array of scintillating optical fibers.

21 Claims, 5 Drawing Sheets

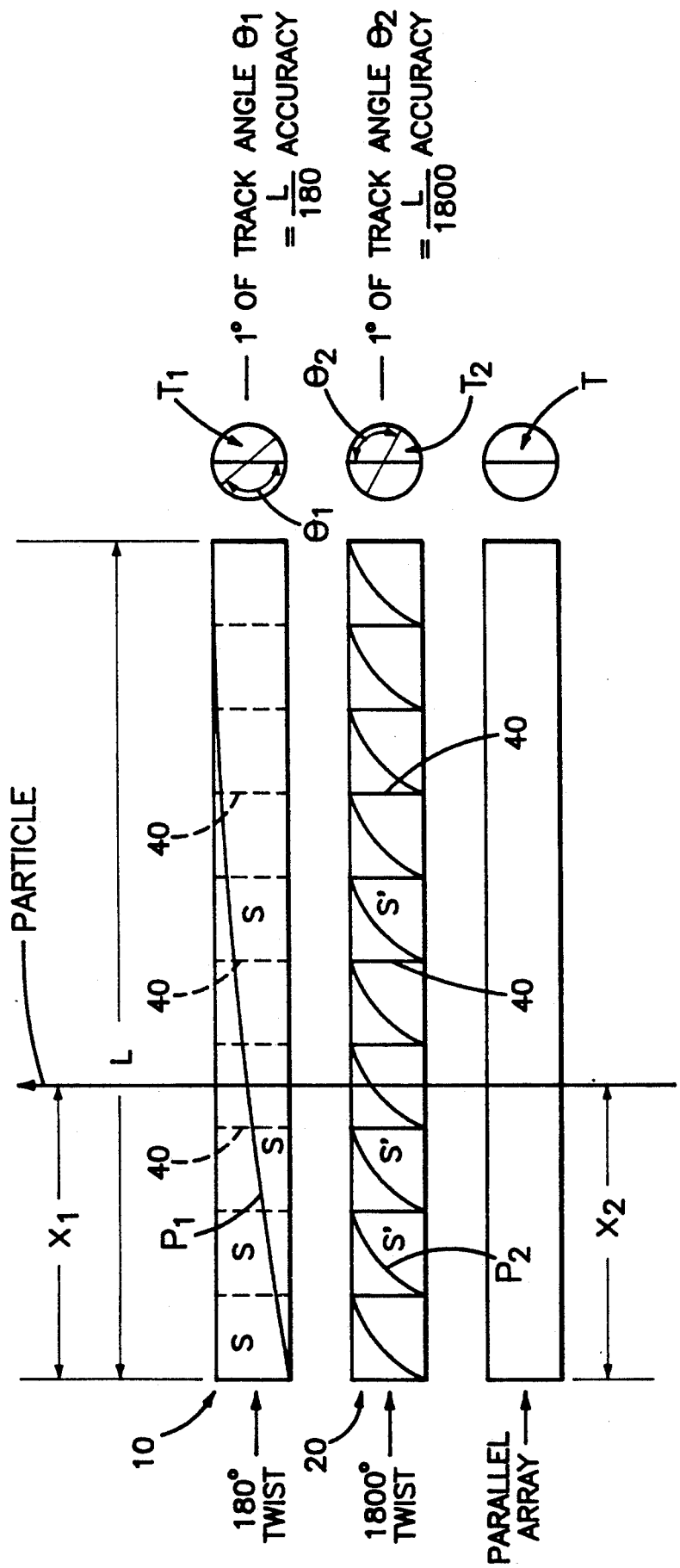

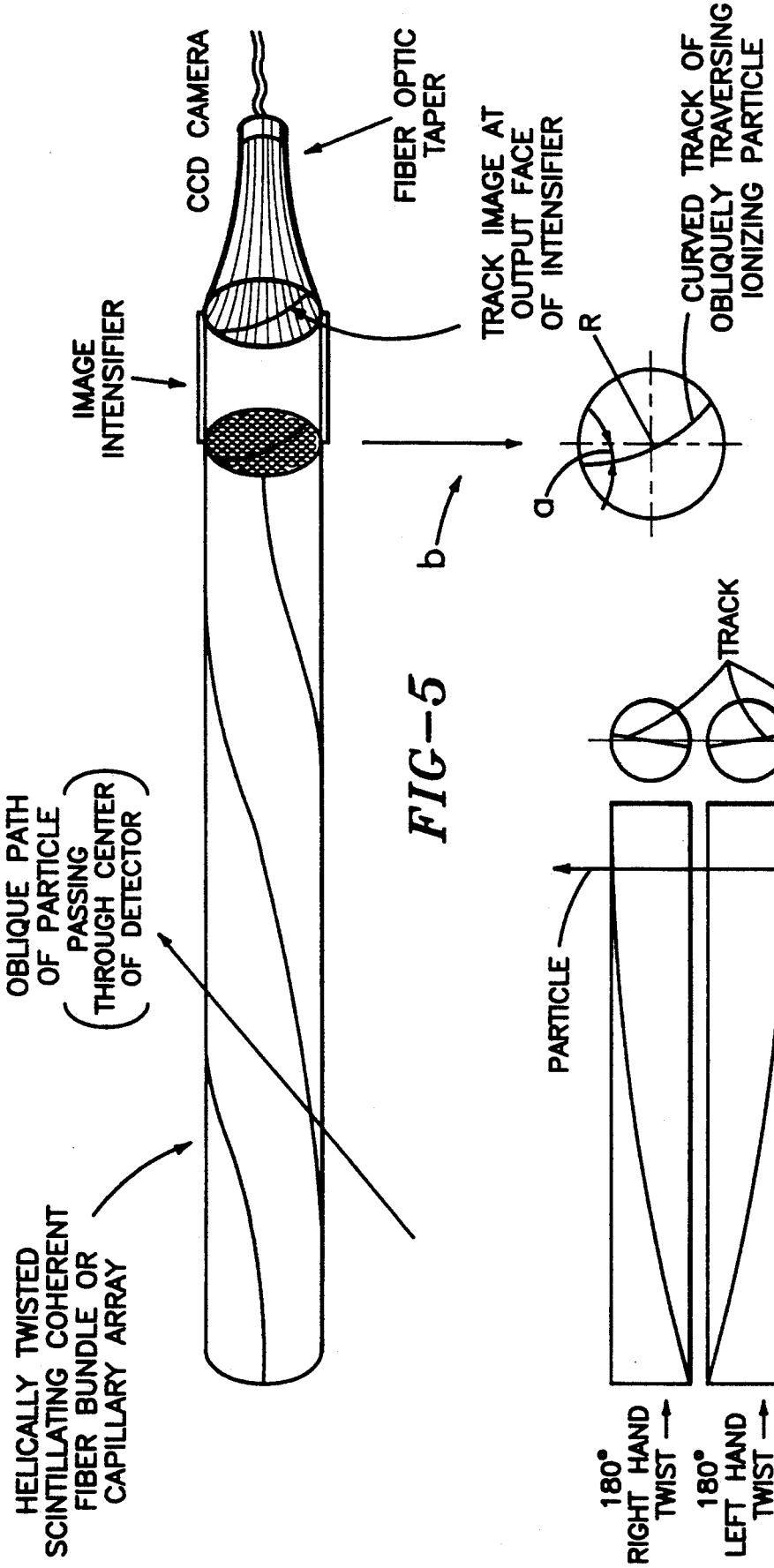

SKETCH OF THE MANUFACTURING PROCESS OF COHERENT, GLASS CAPILLARY BUNDLES

PARTICLE DETECTOR AND METHOD USING A HELICAL ARRAY OF SCINTILLATORS

FIELD OF THE INVENTION

This invention relates to the detection of the passage of energetic ionizing particles through a matrix of scintillating materials such as plastics, glasses or liquids.

BACKGROUND OF THE INVENTION

One of the methods for detecting energetic ionizing particles such as electrons or protons is by means of scintillating materials such as plastics, glasses or liquids. One particular configuration for such a detector is an array of optical fibers made of a scintillating material through which the energetic particle passes. In its passage, it causes some of its energy to be converted to light by the scintillating substance, and this light is transmitted along the fiber or fibers by internal reflection to the end face where it is detected by means of various electro-optical devices.

One specific form of scintillating detector consists of an array of parallel minute glass tubes which are filled with a scintillating liquid and suitably sealed at the ends. Such arrays (termed parallel arrays) may contain several thousand or tens of thousands of minute capillaries ranging in size from 5 to 100 microns.

In current detector arrays, these capillaries are made by glass drawing processes leading to an accurately aligned, parallel array. Such an array may be as much as one meter or longer in length. An energetic particle traversing this array will leave a "track" consisting of light generated in a series of capillary "fibers" along this track. The track will be seen as a series of dots by the electro-optical readout system. This is shown schematically as a line in FIG. 1. In this Figure a set 2 of six scintillating capillary arrays 21, each array comprising a group of minute capillaries, are placed in a line as shown on the right side of FIG. 1 (four array 21 are shown enlarged on the right). An energetic ionizing particle 1 traversing each array of capillaries will cause a track 31 to be seen as a series of dots (shown schematically as a line) as the individual capillaries emit light. For parallel capillaries in a given array, the track will be straight with no rotated track segments.

Further background information on the prior art over which the present invention is an improvement is disclosed and described in two technical articles, one by V. Zacek, "Szintillierende Mikrolichtleiter zum Hochauflosenden Teilchennachweis", Physikalische Blatter 47, (1991) 837-839; and the other by A. Artomonov, et al, "Investigations On Capillaries Filled With Liquid Scintillator For High Resolution Particle Tracking", Nuclear Instruments and Methods A300, (1991) 53-62.

In a parallel array of capillaries, the track of any beam of particles will appear the same at the end face of the array independent of the point along the length of the array where it entered. There is a loss of light along the array due to attenuation, but this may not be recognizable as a means for determining the point of entry along the length.

While the invention will be described with respect to an array of minute capillaries it is entirely within the spirit and scope of the invention that the array be composed of scintillating optical fibers of plastic or glass as well as capillaries filled with a scintillating liquid.

Therefore, for purposes of claiming the invention the language "optical fibers" is intended to include scintillating optical fibers of glass or plastic including minute sealed capillaries filled with a scintillating liquid.

SUMMARY OF THE INVENTION

This invention provides a means and a method for determining the position along the length of an array of optical fibers where the particle enters through the side of the array.

In addition, the present invention provides a method for determining the line of flight of a particle intercepting an array.

A further feature of the invention is the provision of a twisted array (helical array) having a uniform pitch or lead from end to end and of a predetermined length.

A further feature of the invention is the provision of a first helical array of predetermined length having a pitch resulting from a twist of about 180° from end to end.

A further feature of the invention is the provision of a second helical array of predetermined length having a pitch which is substantially less than the pitch of the first helical array.

A further feature of the invention is the provision of a single helical array which can be employed to determine the point of entry, along the length of the array, where the line of flight of an intercepting particle is known.

A further feature of the invention is a method of utilizing a parallel array in combination with a helical array to determine the point of entry when the line of flight is unknown.

The language "line of flight" is intended to denote the path traversed by the particle independent of its direction of progress.

A still further feature of the invention is the preparation and provision of at least two helical arrays of fiber optics where a first helical array is formed with a first uniform pitch or lead (coarse or long pitch) and a second helical array is formed with a second uniform pitch (fine or short pitch) wherein the first and second helical arrays are disposed adjacent a parallel array to increase the accuracy of the measurement of the point of entry of a particle intercepting the three arrays.

A further feature of the invention is the provision of a method of determining the line of flight of a particle intercepting an array at an oblique angle including the determination of the angle at which the oblique interception occurred.

The direction of the particles entering the detector may be known, for example, by the known placement of the detector relative to the source such as a particle accelerator or a target used in conjunction with a particle accelerator.

If the direction of the particles is not known, for example, for particles arriving from outer space, their line of flight and point of entry can be determined with an untwisted (parallel) capillary or fiber array placed adjacent the helical array. Their direction, i.e., left vs. right, up vs. down, will remain ambiguous unless there is further a priori information or relevant evidence such as any branching of the particle track.

BRIEF DESCRIPTION OF THE DRAWINGS

Other features and advantages of the present invention will become more apparent from an examination of the succeeding specification when read in conjunction with the appended drawings, in which:

FIG. 2A shows, schematically, an arrangement wherein two helical arrays, each having a different degree of twist, are disposed side by side next to a parallel array illustrating coarse and fine measurement to increase measurement accuracy;

FIG. 5 shows a helical array of fibers or tubes intercepted by a particle path or particle beam entering the helical array at an oblique angle;

FIG. 5A shows the track of the oblique path; and,

FIG. 7 shows two fiber arrays, one with a right hand twist and one with a left hand twist, adjacent a parallel array of fibers.

DESCRIPTION OF THE INVENTION

Figure 1:
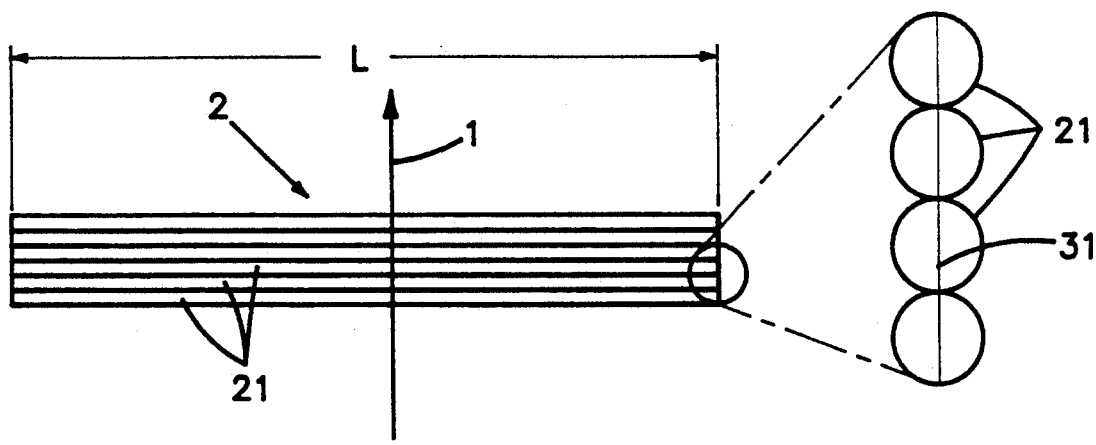
FIG. 1 is a schematic illustration of one form of a prior art detector comprising a plurality of parallel arrays each array composed of scintillating plastic or glass fibers or of minute glass tubes filled with a scintillating fluid and sealed at both ends.

Referring to FIGS. 1 through 4 wherein like elements are designated by like reference numerals, the numeral 21 designates a plurality of parallel arrays composed of scintillating fibers or minute glass tubes filled with a scintillating liquid suitably sealed at each end. As stated earlier, each array 21 may contain thousands or tens of thousands of minute fibers or capillaries ranging in size from 5 to 100 microns.

FIG. 1 shows the prior art wherein in a group or set 2 of six parallel arrays 21 of minute fibers or capillaries are intercepted by a beam 1 comprising an energetic ionizing particle traversing a path generally perpendicular to the several parallel arrays.

An enlargement of four of the six parallel arrays 21 shows the linear track or trace 31 developed by light emitted at the end face of the respective parallel arrays.

While the track is shown in the form of a continuous track 31, in practice the track 31 consists of a plurality of very closely positioned dots.

As will be described in greater detail hereinafter, it is desirable to project the track 31 upon an image intensifier, (FIGS. 5 and 5A,) and thence to a CCD (charge coupled device) camera for convenience in observing the track and in recording the output.

Note that the track 31 produced in FIG. 1 follows a generally straight linear path. In addition, there is no recognizable means to determine where along the length L of the set of parallel arrays 21 that the beam 1 intercepted the set of arrays. Furthermore, there is no convenient or recognizable means for determining the direction from which the beam 1 was projected.

Figure 2:
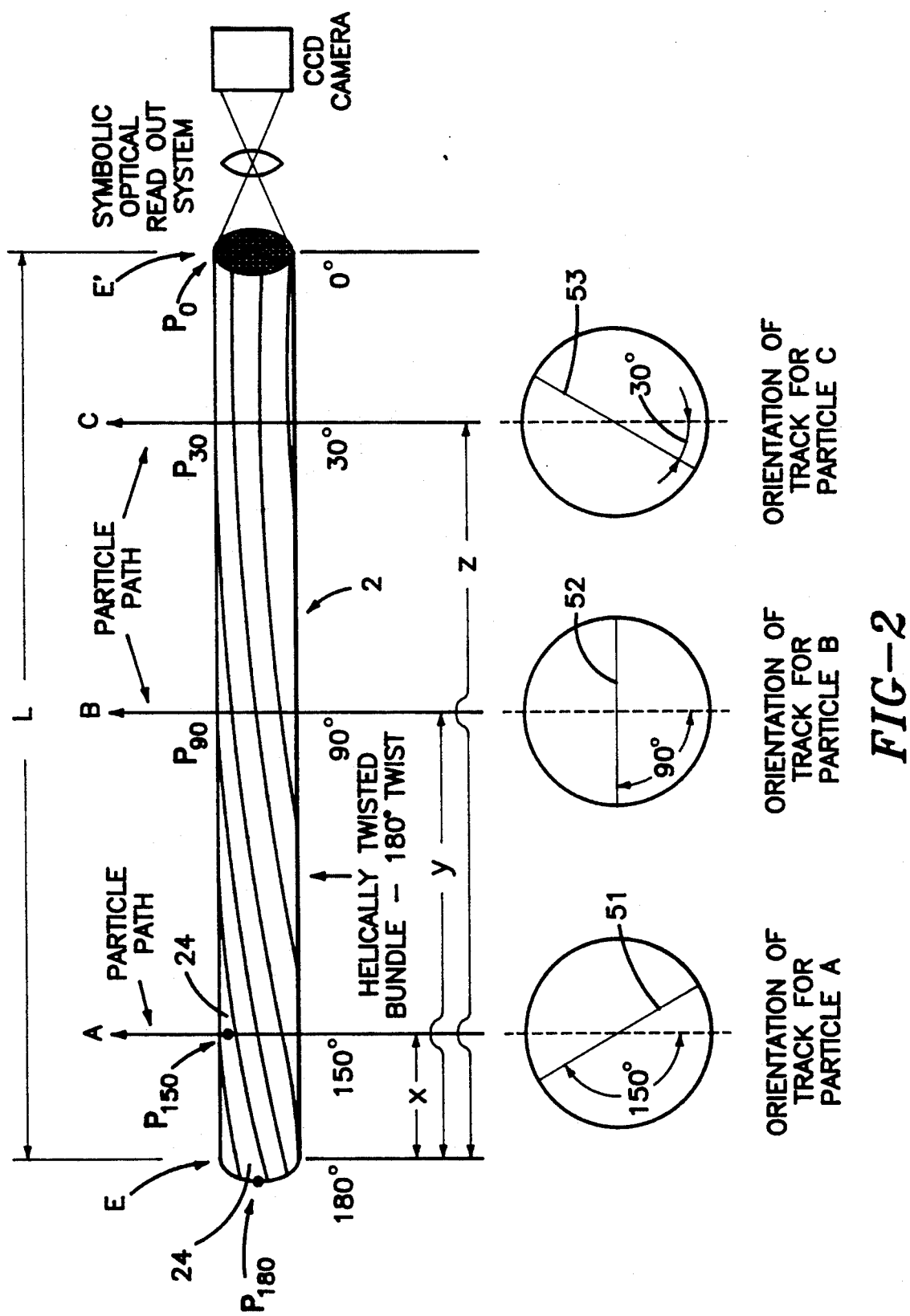
FIG. 2 shows a typical helically twisted array (helical array), greatly enlarged, of fibers or capillary tubes similar to the fibers or tubes of the parallel array of FIG. 1.

A reference to FIG. 2, greatly enlarged, reveals how the present invention operates to identify the point of entry of the particle.

Assume that a single parallel array 21 of minute capillaries of predetermined length such as shown in FIG. 1 has been twisted, at the point of manufacture, through an angle of approximately 180° to develop a uniform helical twist (helical array) from end to end of length L. That is, a point $P_{180}$ on the periphery of the left end E of one capillary 24 of an array of capillaries 22 of FIG. 2 has been displaced approximately 180° relative to a corresponding point $P_0$ on the right end E' of the same capillary.

The direction (hand) of twist, i.e., right-hand or left-hand, the pitch of the helix and the length L must be known.

In practice, and in order to avoid confusion as to which end is adjacent a point of interception, it is advisable to twist the bundle of parallel arrays through an angle just short of 180° such as 175° to 179°.

In FIG. 2 there are shown three particles identified as A, B and C, respectively, intersecting the twisted helical bundle of capillaries 22 at three different locations along the length of the helical array. Here the array has a left-hand twist.

The reference numerals 51, 52 and 53 represent the track projected at the optical readout. For convenience in explaining the operation of the twisted, helical array the tracks are shown in conjunction with the respective particle paths. Normally the individual tracks would appear at an end face of the helical array.

Track 53 (which would appear at the end face of the array 22) is shown rotated approximately 150° relative to the line of the particle A. This rotation occurs because the particle A intercepts the helical array 22 at the point $P_{150}$ on capillary 24 representing a point which has advanced a distance x and has rotated thirty degrees (30°) due to the pitch and the hand of the helix.

Correspondingly, it is readily apparent that the angle of rotation of track 53 of particle C is proportional to the distance of its path from the right end E' of the helical array 22.

Since the individual capillaries in a twisted (helical) array are displaced (point $P_{180}$ will move to point $P_{150}$, for example, and ultimately to point $P_0$), the track of the particle path will be rotated in direct proportion to the location along the length of the helical array at which the particle path entered the array.

Treating the helix formed as a screw thread, the thread will exhibit a predetermined lead or pitch (axial advance of a point on the thread for a full revolution) for a predetermined length of capillaries.

Therefore, a helical array of length L with a known lead, direction of twist and a measurable angle of rotation of the track, one can readily compute the value of x, y or z (FIG. 2) i.e., the point along length L at which the particle path entered the helical array.

One procedure for increasing the accuracy of the measurement of the point along the length of the array at which the particle intercepts the array involves the use of two helical arrays positioned side by side. Both helical arrays are provided with a twist of about 180° from end to end and one twist is left hand and the other right hand so that the value of the angle subtended by the respective tracks as they straddle the particle path is twice the value of the angle subtended by the tracts of a single twisted array relative to the particle path.

In the alternative, FIG. 2A shows schematically how the use of two helical arrays one of coarse lead or pitch and another of fine lead or pitch can be used side by side to increase the accuracy of the measurement of the point at which a particle intercepts.

Assume that the first helical array 10 having a length L, and a coarse pitch P, (180° twist) is disposed adjacent a second helical array 20 having a length L and a fine pitch $P_2$ (1800° twist) with parallel array 30 adjacent helical array 20.

Assume further that for purposes of explanation helical array 10 is divided into 10 equal segments indicated by the dashed lines 40.

Helical array 20 is also divided into the same number of equal segments. Since helical array 20 is twisted 10 times the twist of array 10 ($10 \times 180° = 1800°$), each segment 40 in the helical array 20 represents a 180° twist in each segment.

The track T of helical array 10 subtends an angle 0, with respect to the line of flight of particle P, the track $T_2$ of helical array 20 subtends an angle $O_2$ and the track T of parallel array coincide with the line of flight of particle P.

Thus the distance X resulting from a computation based upon data from helical array 10 amounts to 3 segments S plus a portion of a fourth segment, a relatively coarse measurement because of the long pitch or lead.

The distance $X_2$ also amounts to 3 segments S plus a portion of a fourth segment. However, since each segment S in the helical array 20 represents a 180° twist the computation of that portion of the distance $X_2$ that falls within the fourth segment will be more accurate by a factor of 10 as compared to a computation whose 180° twist extends for the full length L. This is so because the pitch or lead of the helical twist 20 is one-tenth the pitch of the helical array 10.

Therefore, X is considered a coarse measurement and $X_2$ is considered a fine, more accurate measurement.

Figure 3:
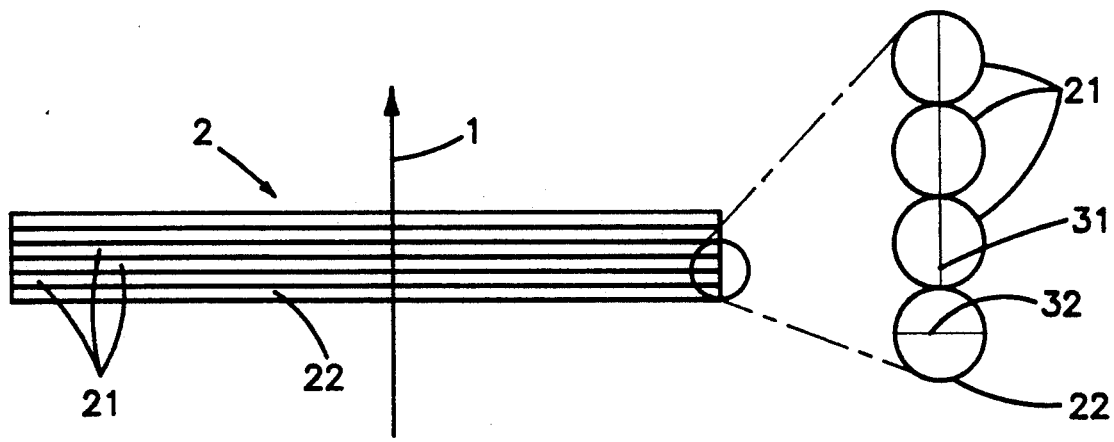
FIG. 3 shows, schematically, an arrangement wherein a helically twisted array of fibers or tubes is positioned immediately adjacent a parallel array of fibers or tubes.

FIG. 3 shows a set 2 of six arrays comprising 5 parallel arrays 21 and one helical array 22. The end faces of three parallel arrays 21 and one helical array 22 are exploded for clarity. The helical array is twisted 180° end to end.

Particle 1 intercepts the set of arrays at approximately the midpoint of the set therefore the track 32 of the helical array is perpendicular to the track 31 of the parallel arrays 21.

As stated earlier if the line of flight of an entering particle is known, then a single helical array is capable of distinguishing the point of entry along the array by measuring the angle of the track relative to the known line of flight.

If the line of flight is not known, then the line of flight as well as the point of entry can be determined by placing a parallel array adjacent to the helical array as shown in FIG. 3.

Figure 4:
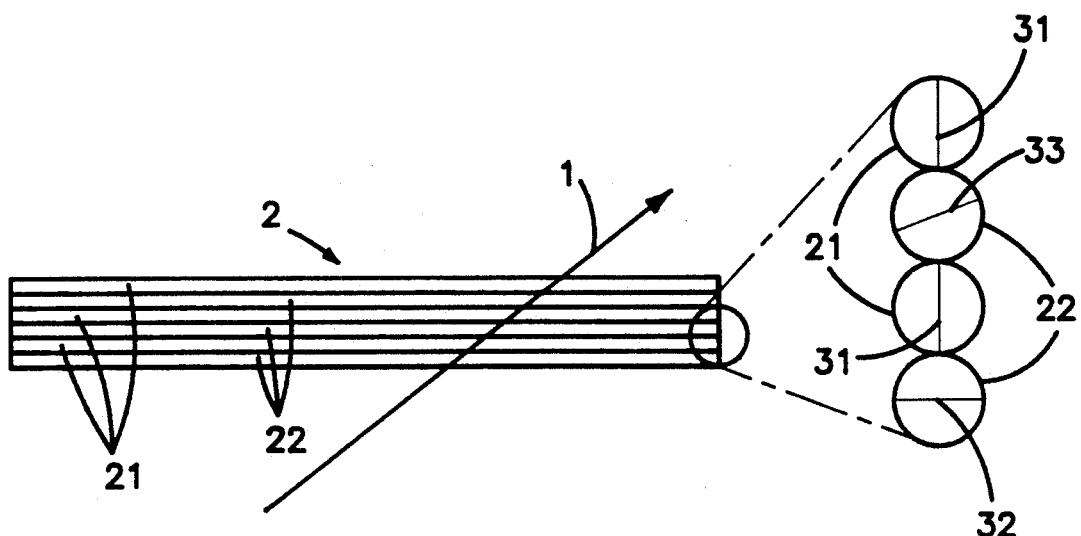
FIG. 4 shown schematically an arrangement wherein helical arrays alternate with parallel arrays and the particle line of flight is oblique.

FIG. 4 shows schematically an assembly of parallel arrays 21 and helical arrays 22 which indicate the path (line of flight) of a particle intercepting the assembly at an oblique angle.

Since the path enters the assembly on or about a midpoint of the helical array 22 of the track 32 is generally perpendicular to the track 31 of the next parallel array 21. The path intercepts the adjacent helical array 22 further along the length of the assembly, thus the track 33 is rotated to a different degree.

Thus, by virtue of the tracks 32 and 33, their angular orientation and a known lead, one can determine the point of entry and the point of egress of the particle path as it traversed the composite assembly of parallel and helical arrays of FIG. 4.

As stated earlier, FIG. 4 is a schematic illustration of the tracks 31, 32 and 33. In practice, the track of an oblique particle path through a helical array is curved as shown in greater detail in FIGS. 5 and 5A.

That is, the track subtends an angle (a) relative to reference line (b) and also exhibits a curve having a radius (r) so that one can measure the subtended angle and the radius of the curve to compute the point of entry of the oblique beam, its direction and the angle of entry.

It is to be understood that there are many possible configurations and assemblies of parallel and helical arrays. For example, the several arrays can be in a two dimensional alternating pattern (checker board fashion) as well as circular or polygonally shaped as desired.

For example, it is within the spirit and scope of the invention that an assembly of twisted and parallel arrays may each be of different composition or structure. That is, a parallel array may comprise capillaries containing a scintillating liquid, while the individual twisted arrays may be composed of plastic or glass fibers containing scintillating materials, as desired. Obviously capillaries or plastic or glass fibers are not intermixed in any given arrays.

Figure 6:
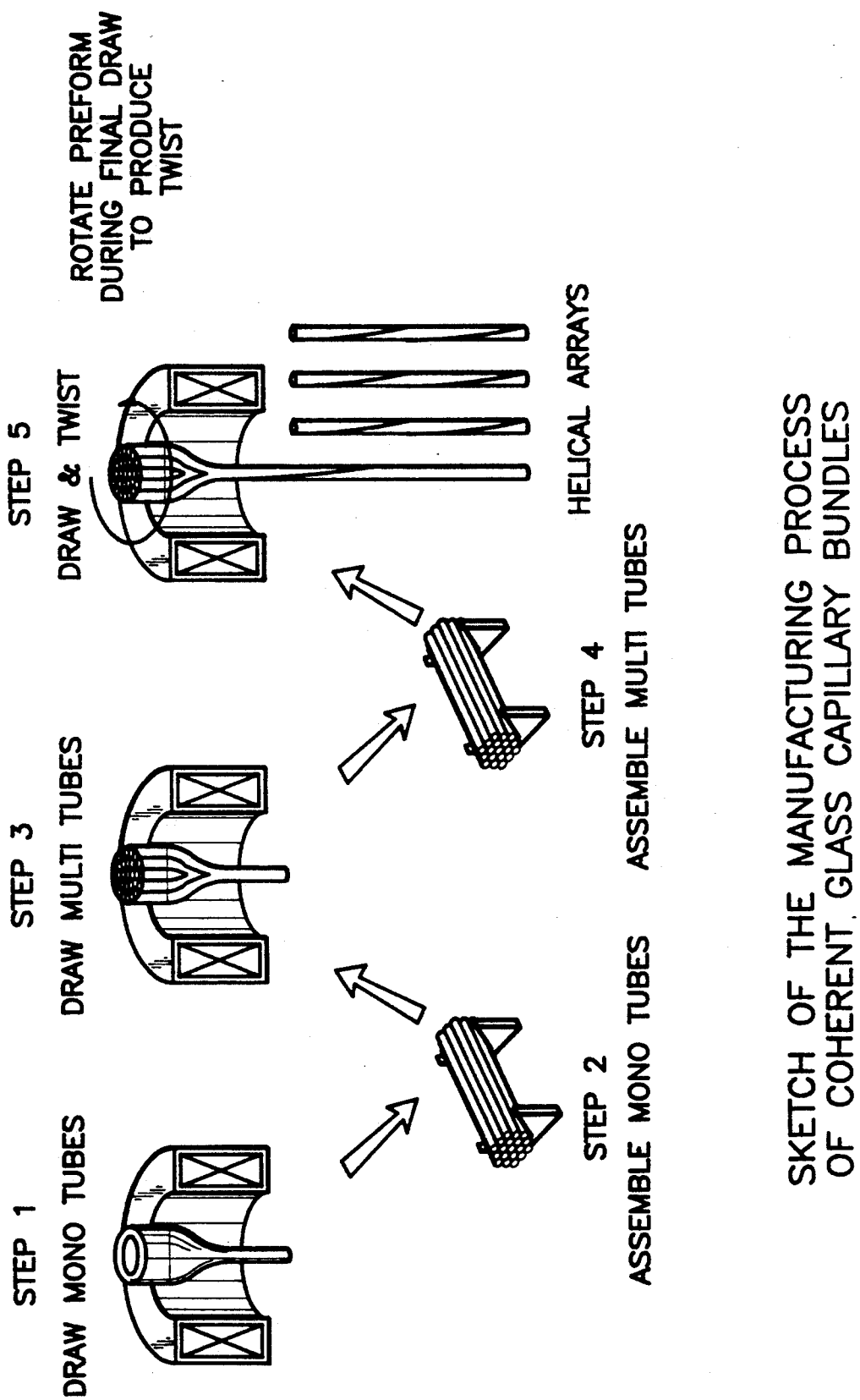
FIG. 6 shows schematically the steps in the manufacture of an array of capillaries and the step of twisting a parallel array to develop a helical array.

FIG. 6 is a schematic illustration of the method steps in drawing and bundling optical fibers of glass or plastic including capillaries.

FIG. 7 shows two arrays, one with a right hand twist and one with a left hand twist, adjacent a parallel array of fibers.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method of determining the point of entry of an ionizing particle intercepting a helically twisted array of scintillating optical fibers having a known pitch and a known length, said particle having a known line of flight and said particle creating a track detected at an end face of said array, comprising the steps of:

measuring the angle between the track and the line of flight, and utilizing the angle, pitch and length of the array to compute the point of entry.

2. The method of claim 1 wherein the helical twist from end to end of said array is about 180°.

3. The method of claim 2 wherein the helical twist from end to end of said array is less than 180°.

4. A method of detecting the point of entry of an energetic ionizing particle intercepting an array of optical fibers of finite length, from a known direction, wherein the fibers include a scintillating material causing some of the energy of the particle to convert to light, said light being transmitted along the fibers by internal reflection to an end face of the array where the energetic particle traversing the array of fibers displays a track or a trace upon an optical readout system adjacent said end face comprising the steps of:

shaping an array of optical fibers into a uniform helical twist about a longitudinal axis;

positioning said array to allow an ionizing particle from said known direction to intercept said array to produce said track; and measuring the angle subtended by the track and said known direction to compute the point along the axis of said helical twist at which said particle intercepts said array.

5. The method of claim 4 plus the step of electro-optically intensifying the track to enhance the image of said track.

6. A method of detecting the line of flight of an energetic ionizing particle intercepting an array of optical fibers of finite length at an oblique angle wherein the fibers include a scintillating material causing some of the energy of the particles to convert to light, said light being transmitted along the fibers by internal reflection to an end face of the array where the energetic particle traversing the array of fibers display a track or a trace upon an optical readout system adjacent said end face comprising the steps of:

shaping an array of optical fibers into a uniform helical twist of known pitch over a finite length and about a longitudinal axis;

establishing a generally linear reference line upon said optical readout system:

positioning said array to allow said particle to intercept said array to produce said track;

measuring the angle subtended by the track and said reference line;

measuring the radius of said track; and utilizing the values of the angle and the radius in conjunction with the pitch to compute the point of entry and the point of egress and thus the line of flight of said particle.

7. The method of claim 6 plus the step of electro-optically intensifying the track to enhance the image of said track.

8. The method of claim 6 wherein the helical twist from end to end of said array is about 180°.

9. A method, of detecting the point of entry of an energetic ionizing particle intercepting a group of optical fibers from an unknown direction wherein the fibers include a scintillating material and the energetic ionizing particle traversing the fibers displays a track or a trace upon an optical readout system adjacent an end face of said optical fibers comprising the steps of:

arranging the optical fibers into at least two arrays of finite length;

a first array of said fibers being aligned parallel;

a second array of said fibers having a uniform helical twist throughout the length of said array;

disposing said first array adjacent said second array so that said arrays produce adjacent tracks whereby the track of said first array indicates the line of flight of said particle and the angle subtended by the line of flight and the track of the second array is proportional to the point along the length of the second array at which the particle intercepted both arrays.

10. The method of claim 9 plus the step of electro-optically intensifying each track to enhance the image of each said track.

11. A particle detector comprising a helical array of liquid filled capillaries defining a helix of uniform pitch and of predetermined twist, said array having end faces and being of predetermined length, said liquid defining a scintillating material whereby an energetic particle intercepting the array along a known line of flight produces a recognizable track at one end face and whereby the angular relationship between the track and the line of flight is a measure of the point of interception along the length of said array.

12. The helical array of claim 11 wherein the outer diameter of the capillaries ranges from 5 to 100 microns.

13. The helical array of claim 11 wherein the amount of twist from end face to end face is less than 180°.

14. A particle detector in which a parallel array of capillaries filled with scintillating liquid is positioned adjacent a helical array of capillaries filled with said liquid so that the relative positions of the tracks of a particle intercepting each array is an indication of the line of flight of said particle and the point of interception along the length of the arrays.

15. A particle detector comprising at least one parallel array and one helical array of scintillating optical fibers wherein the composition of the at least one parallel array is selected from the group consisting of capillaries containing a scintillating liquid or scintillating plastic or glass fibers.

16. A particle detector comprising at least one parallel array and one helical array of scintillating optical fibers wherein the composition of the helical array is selected from the group consisting of capillaries containing a scintillating liquid or scintillating plastic or glass fibers.

17. A method of increasing the accuracy of the measurement of the point of entry of an energized particle intercepting a group of scintillating fiber optic arrays comprising the steps of:

providing a first helical array having a long pitch;

providing a second helical array having a short pitch;

disposing the first and second helical arrays side by side where the measurement of the point of entry of said particle along the length of the first array is a coarse measurement and the corresponding measurement along the second array is of greater accuracy because of the shorter pitch.

18. The method of claim 17 in which the pitch of the first helical array is a multiple of the pitch of the second array.

19. The method of claim 17 in which the first helical array is formed with a helical twist from end to end of about 180° and the helical twist from end to end of the second array is about 1800°.

20. The method of claim 17 plus the step of providing a third parallel array of optical fibers and disposing the third array adjacent the first and second arrays whereby the line of flight of said particle can be established.

21. A particle detector in which a plurality of arrays of scintillating optical fibers of finite length are arranged side by side comprising:

a first array of said fibers aligned parallel, a second array of said fibers having uniform right hand helical twist throughout the length of said second array, and a third array of said fibers having a uniform left hand helical twist throughout the length of said third array, so that the relative positions of the tracks of a particle intercepting the first and second arrays is an indication of the line of flight of said particle and the point of interception along the length of the first and second arrays and so that the relative position of the tracks of a particle intercepting the first and third arrays is also an indication of the line of flight of said particle and the part of interception along the length of the first and third arrays whereby the accuracy of line of flight and the point of entry of the particle is verified.

* * * * *